(12) United States Patent
Gladish et al.

(10) Patent No.: US 12,464,578 B2
(45) Date of Patent: *Nov. 4, 2025

(54) METHODS, APPARATUSES, AND SYSTEMS FOR MANAGING NETWORK COMMUNICATIONS

(71) Applicant: Comcast Cable Communications, LLC, Philadelphia, PA (US)

(72) Inventors: Jacob Gladish, Blue Bell, PA (US); Anil Katragadda, Downingtown, PA (US); Giridhar Nelapati, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,634

(22) Filed: Mar. 11, 2024

(65) Prior Publication Data

US 2025/0081258 A1    Mar. 6, 2025

Related U.S. Application Data

(63) Continuation of application No. 17/665,102, filed on Feb. 4, 2022, now Pat. No. 11,956,837, which is a continuation of application No. 16/521,259, filed on Jul. 24, 2019, now Pat. No. 11,284,454.

(51) Int. Cl.
| | |
|---|---|
| *H04W 76/11* | (2018.01) |
| *H04W 4/80* | (2018.01) |
| *H04W 8/26* | (2009.01) |
| *H04W 28/06* | (2009.01) |
| *H04W 80/02* | (2009.01) |

(52) U.S. Cl.
CPC .............. *H04W 76/11* (2018.02); *H04W 4/80* (2018.02); *H04W 8/26* (2013.01); *H04W 28/06* (2013.01); *H04W 80/02* (2013.01)

(58) Field of Classification Search
CPC ......... H04W 76/11; H04W 4/80; H04W 8/26; H04W 28/06; H04W 80/02
USPC .......................................................... 370/329
See application file for complete search history.

(56) References Cited

U.S. PATENT DOCUMENTS

| | | | |
|---|---|---|---|
| 7,404,006 B1 * | 7/2008 | Slaughter | ................ H04L 61/30 370/254 |
| 8,982,708 B1 | 3/2015 | McCabe et al. | |
| 9,961,022 B1 | 5/2018 | Kahn et al. | |

(Continued)

FOREIGN PATENT DOCUMENTS

| | | |
|---|---|---|
| WO | 2015179358 A1 | 11/2015 |
| WO | 2018009159 A1 | 1/2018 |
| WO | 2018009160 A1 | 1/2018 |

*Primary Examiner* — Christopher R Crompton
(74) *Attorney, Agent, or Firm* — Ballard Spahr LLP

(57) ABSTRACT

Methods, apparatuses, and systems for wireless communication are described. A computing device may send data to a plurality of network devices. A coordinator device may receive, or monitor, the data received by the plurality of network devices from the computing device. The coordinator device may determine that one or more of the plurality of network devices are to process additional data received from the computing device. The coordinator device may cause the remaining network devices of the plurality of network devices to discard or disregard, for an amount of time, additional data received from the computing device.

27 Claims, 11 Drawing Sheets

(56) References Cited

U.S. PATENT DOCUMENTS

| | | |
|---|---|---|
| 11,284,454 B2 * | 3/2022 | Gladish ................. H04W 40/24 |
| 11,956,837 B2 * | 4/2024 | Gladish ................. H04W 84/18 |
| 2002/0172207 A1 | 11/2002 | Saito et al. |
| 2003/0112803 A1 | 6/2003 | Matsugatani et al. |
| 2003/0212821 A1 | 11/2003 | Gillies et al. |
| 2004/0167988 A1 | 8/2004 | Rune et al. |
| 2008/0002684 A1 * | 1/2008 | Kumazawa ............. H04W 8/26 370/389 |
| 2008/0137625 A1 | 6/2008 | Hori et al. |
| 2009/0180448 A1 | 7/2009 | Kobayashi |
| 2011/0134885 A1 | 6/2011 | Wu et al. |
| 2016/0050526 A1 | 2/2016 | Liu et al. |
| 2018/0092151 A1 | 3/2018 | Liu et al. |
| 2018/0124632 A1 | 5/2018 | Thubert et al. |
| 2018/0234351 A1 | 8/2018 | Amento et al. |
| 2018/0316681 A1 | 11/2018 | Frahim et al. |
| 2018/0368042 A1 * | 12/2018 | Jin ........................ H04W 76/15 |
| 2019/0289447 A1 | 9/2019 | Zhou et al. |
| 2019/0296969 A1 * | 9/2019 | Zimny ................. H04W 12/03 |
| 2020/0008254 A1 | 1/2020 | Beck |

* cited by examiner

610
RECEIVE, FROM A PLURALITY OF NETWORK DEVICES, DATA COMPRISING AN IDENTIFIER ASSOCIATED WITH A COMPUTING DEVICE

620
DETERMINE AT LEAST ONE NETWORK DEVICE OF THE PLURALITY TO PROCESS ADDITIONAL DATA RECEIVED FROM THE COMPUTING DEVICE

630
SEND, TO THE REMAINING NETWORK DEVICES OF THE PLURALITY, AN INSTRUCTION SIGNAL

METHODS, APPARATUSES, AND SYSTEMS FOR MANAGING NETWORK COMMUNICATIONS

CROSS-REFERENCE TO RELATED PATENT APPLICATION

This application is a continuation of U.S. Non-provisional application Ser. No. 17/665,102, filed Feb. 4, 2022, which is a continuation of U.S. Non-provisional application Ser. No. 16/521,259, filed on Jul. 24, 2019 and issued as U.S. Pat. No. 11,284,454, the entireties of which are incorporated by reference herein.

BACKGROUND

As more computing devices utilize communication networks (e.g., wireless communication networks), backhaul traffic and overall congestion on communication networks increases. The problem is multiplied when a plurality of access points (e.g., network devices) on a communication network receive data from one or more computing devices and forward multiple copies of the data to a backhaul portion of the communication network for processing. Further, computing devices may experience interference when sending data to a given access point. Access points on most communication networks use Wi-Fi, which typically operates in one or more bands (e.g., 2.4 GHz, 5 GHZ, etc.). Many computing devices utilize Wireless Personal Area Networks (WPANs), such as ZigBec, Z-Wave, or Bluetooth™, which often utilize the same one or more bands as the communication networks. Since computing devices that utilize WPANs tend to be low powered devices, data transmissions from these computing devices may be overpowered by communications between Wi-Fi devices, such as access points and user devices.

SUMMARY

It is to be understood that both the following general description and the following detailed description are exemplary and explanatory only and are not restrictive. Methods, apparatuses, and systems for wireless communication are described. A plurality of computing devices may each send data (e.g., a packet of data) to a plurality of network devices (e.g., access points). The plurality of network devices may be in communication with a coordinator device (e.g., a backhaul network device), which may receive multiple copies of data sent by each of the computing devices via the plurality of network devices. The coordinator device may, based on network parameters associated with one or more computing devices, select one or more of the plurality of network devices to process additional data received by each of the computing devices. The network parameters may be based on a determined level of interference associated with one or more of the plurality of network devices and the one or more computing devices (e.g., due to communication with a user device and/or distance from a computing device). The coordinator device may send an instruction signal to the remaining network devices. The instruction signal may be indicative of one or more identifiers for the one or more computing devices. The instruction signal may cause the remaining network devices, for an amount of time, to discard or disregard additional data received from the one or more computing devices (e.g., based on the one or more identifiers). These and other considerations are addressed by the present description.

BRIEF DESCRIPTION OF THE DRAWINGS

The accompanying drawings, which are incorporated in and constitute a part of this specification, show examples and together with the description, serve to explain the principles of the methods, apparatuses, and systems:

FIG. 6 shows a flowchart of an example method for wireless communication; and

DETAILED DESCRIPTION

Figure 1A:
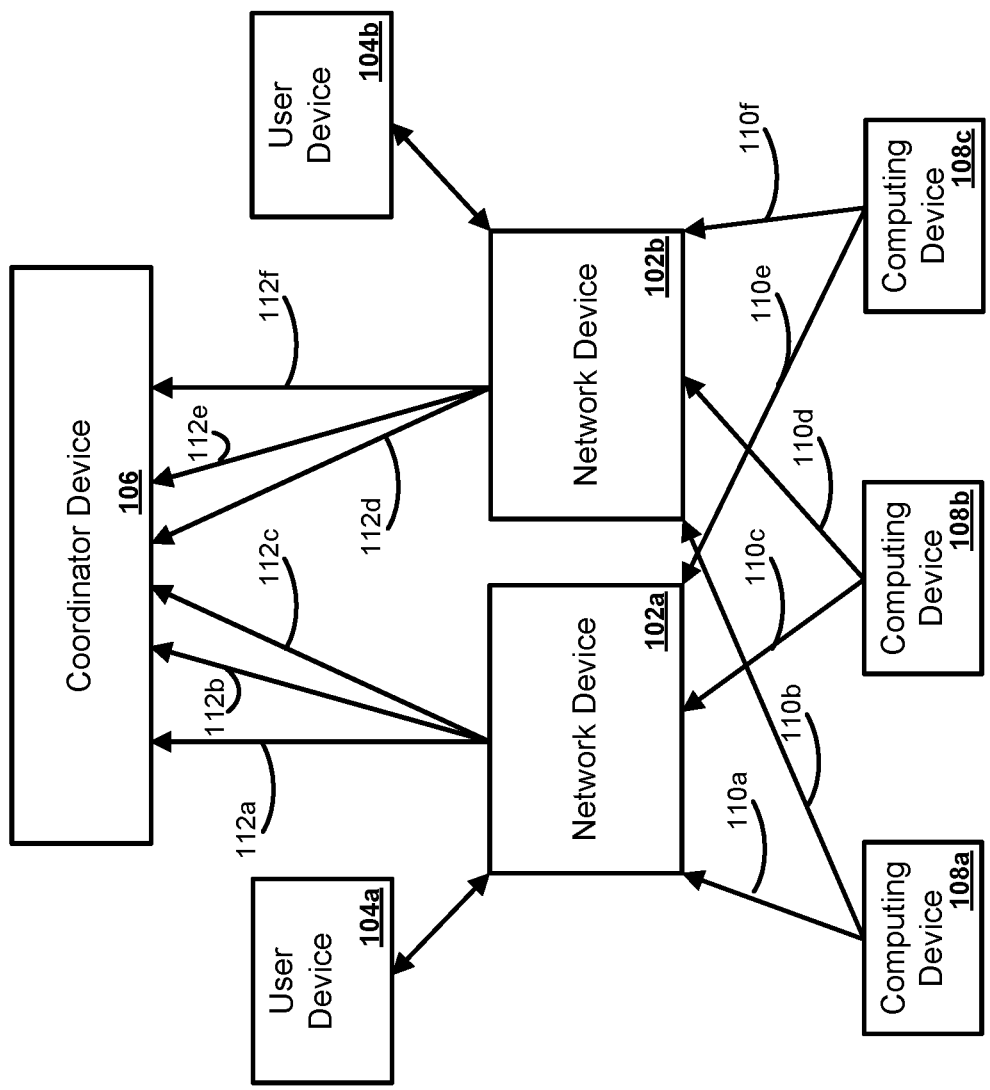
FIG. 1A shows an example system for wireless communication.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions. This detailed description may refer to a given entity performing some action. It should be understood that this language may in some cases mean that a system (e.g., a computer) owned and/or controlled by the given entity is actually performing the action.

Methods, apparatuses, and systems for wireless communication are described. A plurality of computing devices that communicate via a low-energy communication protocol, such as a ZigBee network, a Z-wave network, a Bluetooth™ network, etc., may each send data (e.g., a packet of data, a beacon, etc.) that may be received by/via a plurality of network devices of a wireless communication network (e.g., network access points). The network devices may communicate via the low-energy communication protocol used by the computing devices. The network devices may communicate with one or more user devices, such as set-top boxes, mobile devices, tablets, etc., using another communication protocol, such as, for example, Wi-Fi, mobile communications networks, radio frequency, a combination thereof, and/or the like. The network devices may communicate with a coordinator device (e.g., a backhaul network device) via a wireless and/or terrestrial communication path.

The coordinator device may receive redundant data from/via the network devices. The redundant data may be multiple copies of data sent by one or more of the computing devices to the network devices. For example, three network devices may be proximate to a computing device that is sending data, but only two of the three network devices may be receiving the data (e.g., due to proximity, interference, etc.). Each of the network devices that received the data from the computing device may send (e.g., forward) the data to the coordinator device, thereby resulting in redundant data being processed by the coordinator device and a backhaul portion of the network.

The coordinator device may receive metadata sent by/via each of the network devices. The metadata sent by/via each of the network devices may be received by the coordinator device in tandem with, or separately from, redundant data sent by/via each of the network devices. Metadata sent by a given network device may indicate network parameters associated with the given network device. The network parameters may be, for example, a WiFi channel and utilization; a ZigBee channel and utilization; a Bluetooth™ utilization; a Z-Wave channel and utilization; a signal strength associated with one or more of the computing devices; system resource utilization; a determined level of interference associated with communications with a user device; a determined distance from a computing device; a combination thereof, and/or the like.

The coordinator device may select one or more of the network devices that are to continue processing (e.g., sending to the coordinator device) additional data received by one or more of the computing devices. In this way, the coordinator device may reduce the amount of redundant data received from/via the network devices. The coordinator device may therefore reduce an amount of backhaul network resources needed to process the additional data received by the one or more of the computing devices. The coordinator device may select the one or more network devices based on the network parameters associated with a given network device (e.g., based on metadata sent by a given network device). For example, three network devices may be proximate to a first and a second computing device that are each sending data. The first and the second network devices may be indicating to the coordinator device (e.g., via metadata) that each is experiencing a high level of interference and/or a poor reception strength with respect to the first computing device. The coordinator may determine that the third network device (e.g., the network device that is not indicating a high level of interference and/or a poor reception strength with respect to the first computing device) is to continuing processing additional data received via the first computing device. The coordinator device may send an instruction signal to the remaining network devices (e.g., the two network devices that indicated the high level of interference and/or a poor reception strength with respect to the computing device).

The instruction signal may be indicative of an identifier for the first computing device. The identifier may be, for example, a Media Access Control ("MAC") address; an internet protocol ("IP") address; a universal unique identifier ("UUID"); a combination thereof; and/or the like. The instruction signal may cause the remaining network devices to each generate a routing table entry (e.g., an access control list entry stored in memory of a given network device)

indicative of the identifier for the first computing device. The routing table entry may cause the remaining network devices, for an amount of time, to discard or disregard additional data received from/via the first computing device (e.g., based on the identifier). The coordinator device may continue processing data normally during this amount of time. Put differently, the coordinator device may not be affected by the instruction signal, and it may continue sending data to, and/or receiving data from/via, each of the network devices during the amount of time. The remaining network devices may resume processing data received from/via the first computing device once the amount of time has lapsed (e.g., the remaining network devices may remove the generated routing table entries after the amount of time has lapsed).

A computing device may change position relative to at least one network device that was selected by the coordinator device to continue processing additional data received from the computing device. Continuing with the example above, the first computing device may change position such that additional data sent by the first computing device may not be received by the third network device (e.g., the network device that was selected by the coordinator device to continue processing additional data received from the first computing device). The coordinator device may determine that the first computing device has changed position based on an amount of time during which the coordinator device does not receive data sent by/via the first computing device to the third network device (e.g., an amount of time during which the third network device has not sent to the coordinator device data received from the first computing device). The coordinator device may send to each of the remaining network devices a further instruction signal instructing each to remove the routing table entry associated with the first computing device, thereby enabling the remaining network devices to resume processing data received from/via the first computing device.

FIGS. 1A-1E shows a system 100 for wireless communication. Those skilled in the art will appreciate that digital equipment and/or analog equipment may be employed. Those skilled in the art will appreciate that provided herein is a functional description and that the respective functions may be performed by software, hardware, or a combination of software and hardware.

The system 100 may have network devices 102a, 102b, user devices 104a, 104b, and/or computing devices 108a, 108b, 108c. As will be appreciated by one skilled in the art, the system 100 may have any quantity of network devices 102a, 102b, user devices 104a, 104b, and computing devices 108a, 108b, 108c. The network devices 102a, 102b may be wireless communication devices such as, for example, wireless routers, gateways, access points, a combination thereof, and/or the like. The network devices 102a, 102b may each utilize one or more communication protocols. The network devices 102a, 102b may each have two or more radio transceivers for utilizing the two or more communication protocols. The network devices 102a, 102b may utilize a Wi-Fi communication protocol to communicate with the user devices 104a, 104b and may utilize a Wireless Personal Area Network (WPAN) protocol to communicate with the computing devices 108a, 108b, 108c. The network devices 102a, 102b may also utilize a low-energy communication protocol such as, for example, a ZigBee network, a Z-Wave network, a Bluetooth™ network, a combination thereof, and/or the like. The Wi-Fi network and the WPAN may communicate via a same channel (e.g., a 2.4 GHz channel). The network devices 102a, 102b may each be configured with a first Service Set Identifier (SSID) (e.g., associated with a user network or private network) to function as a local network for a particular user or users (e.g., user devices 104a, 104b). The network devices 102a, 102b may each be configured with a second SSID (e.g., associated with a public/community network or a hidden network) to function as a secondary network or redundant network for a particular user or users (e.g., user devices 104a, 104b).

The user devices 104a, 104b may each be an electronic device such as a computer, a smartphone, a laptop, a tablet, a set top box, a display device, or other device capable of communicating with the network devices 102a, 102b. The user devices 104a, 104b may each communicate with the network devices 102a, 102b via a wireless communication network. The wireless communication network may be a Wi-Fi network, a low-energy communication protocol, such as a ZigBee network, a Z-Wave network, a Bluetooth™ network, a combination thereof, and/or the like. The user devices 104a, 104b may utilize the wireless network to communicate with the network devices 102a, 102b. The user devices 104a, 104b may communicate via the network devices 102a, 102b to access a service, such as the Internet.

The computing devices 108a, 108b, 108c may each be a low powered electronic device such as a sensor, a smart device, a security system, an electronic camera, a smart doorbell, a Bluetooth™ device, a ZigBee device, a Z-Wave device, a Low Power Wide Area Network (LPWAN) device, combinations thereof, and/or the like. The computing devices 108a, 108b, 108c may utilize, e.g., the WPAN network or the LPWAN network to communicate with the network devices 102a, 102b. The computing devices 108a, 108b, 108c may provide one or more communication characteristics of the computing devices 108a, 108b, 108c to the network devices 102a, 102b. The communication characteristics may be, for example, a Link Quality Indicator (LQI), a Relative Received Signal Strength Indicator (RSSI), a Packet Error Rate (PER), combinations thereof, and/or the like. The computing devices 108a, 108b, 108c may provide the one or more communication characteristics of the computing devices 108a, 108b, 108c to the network devices 102a, 102b on an ad-hoc basis.

The computing devices 108a, 108b, 108c may each send data 110a,b,c,d,e,f that may be received by/via one or more of the network devices 102a, 102b. The data 110a,b,c,d,e,f may have, for example, a packet, a beacon, a combination thereof, and/or the like. The network devices 102a, 102b may be in communication with a coordinator device 106 (e.g., a backhaul network device) via a wireless and/or a terrestrial communication path. The coordinator device 106 may monitor or receive, via/from the network devices 102a, 102b, multiple transmissions 112a,b,c,d,e,f, which may be indicative of the data 110a,b,c,d,e,f received by/via each of the one or more network devices 102a, 102b.

The coordinator device 106 may monitor or receive metadata sent by some or all (e.g., each) of the network devices 102a, 102b as part of the multiple transmissions 112a,b,c,d,e,f. The metadata sent by each of the network devices 102a, 102b may be received via/by the coordinator device 106 in tandem with the multiple transmissions 112a,b,c,d,e,f. The metadata sent by one, or both, of the network devices 102a, 102b may be indicative of one or more network parameters associated with the network device 102a or 102b and/or the one or more communication characteristics of the computing devices 108a, 108b, 108c. The one or more network parameters may be, for example, a WiFi channel and utilization; a ZigBee channel and utilization; a Z-Wave channel and utilization; a Bluetooth™ utilization; a signal strength associated with one or more of the computing devices 108a, 108b, 108c; system resource utilization; a determined level of interference associated with communications between the network devices 102a, 102b and one or more of the user devices 104a, 104b; a determined level of interference associated with receiving data from one or more of the computing devices 108a, 108b, 108c; a determined distance from one or more of the computing devices 108a, 108b, 108c; combinations thereof; and/or the like.

Figure 1B:
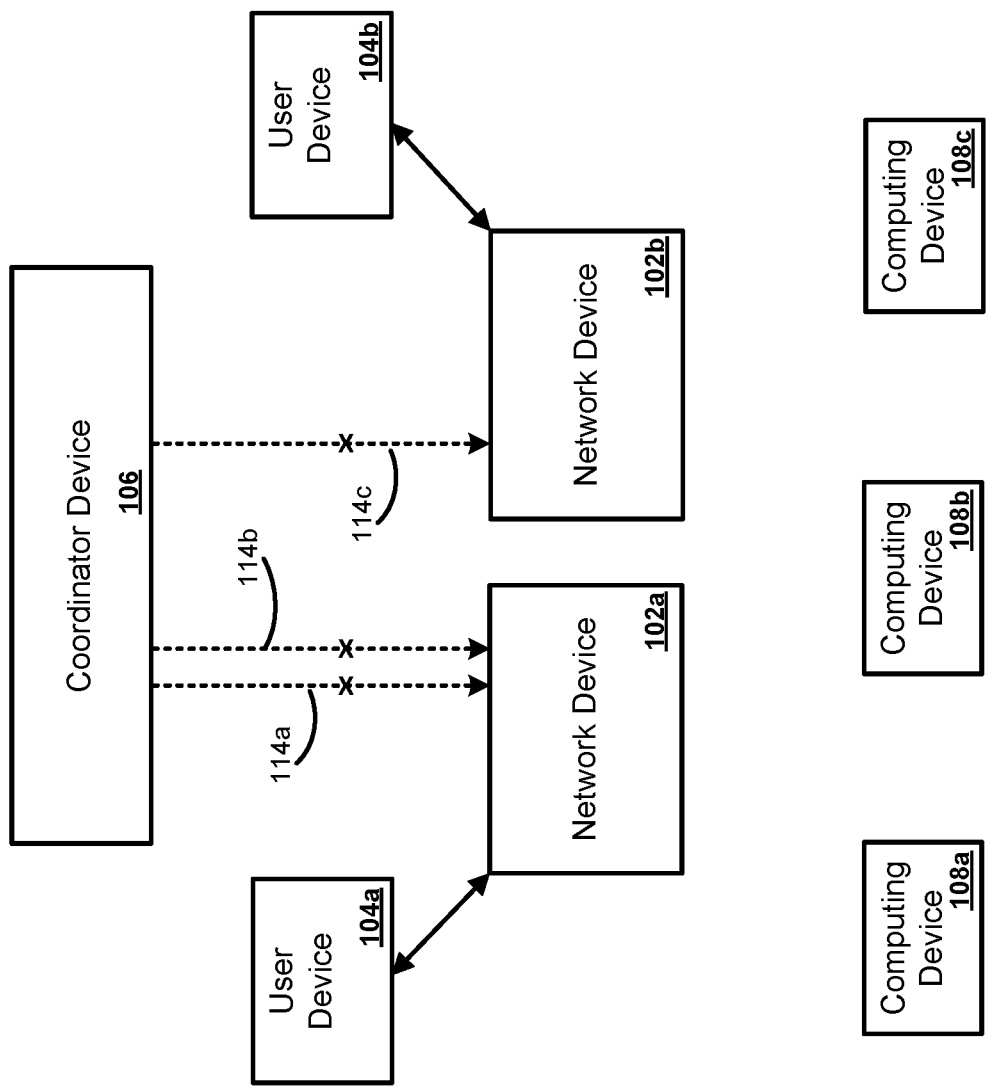
FIG. 1B shows an example system for wireless communication.

The coordinator device 106 may determine (e.g., select), based on the one or more network parameters received from/via the network devices 102a, 102b, one or both of the network devices 102a, 102b to process additional data received by/via each of the computing devices 108a, 108b, 108c. The additional data sent by a given computing device 108a, 108b, 108c may be processed by one, or both, of the network device 102a, 102b. As shown in FIG. 1B, the coordinator device 106 may send instruction signals 114a, 114b to the network device 102a. The instruction signal 114a may be indicative of an identifier for the computing device 108b. The identifier for the computing device 108b may be, for example, a Media Access Control ("MAC") address; an internet protocol ("IP") address; a universal unique identifiers ("UUID"); a URL address; any combinations thereof; and/or the like. The instruction signal 114b may be indicative of an identifier for the computing device 108c. The identifier for the computing device 108c may be, for example, a Media Access Control ("MAC") address; an internet protocol ("IP") address; a universal unique identifiers ("UUID"); combinations thereof; and/or the like. The instruction signal 114a may cause the network device 102a to generate a first routing table entry (e.g., an access control list entry stored in memory of network device 102a) indicative of the identifier for the computing device 108b. The instruction signal 114b may cause the network device 102a to generate a second routing table entry (e.g., an access control list entry stored in memory of network device 102a) indicative of the identifier for the computing device 108c.

As also shown in FIG. 1B, the coordinator device 106 may send the instruction signal 114c to the network device 102b. The instruction signal 114c may be indicative of an identifier for the computing device 108a. The identifier for the computing device 108a may be, for example, a Media Access Control ("MAC") address; an internet protocol ("IP") address; a universal unique identifiers ("UUID"); a combination thereof; and/or the like. The instruction signal 114c may cause the network device 102b to generate a routing table entry (e.g., an access control list entry stored in memory of the network device 102b) indicative of the identifier for the computing device 108a.

Figure 1C:
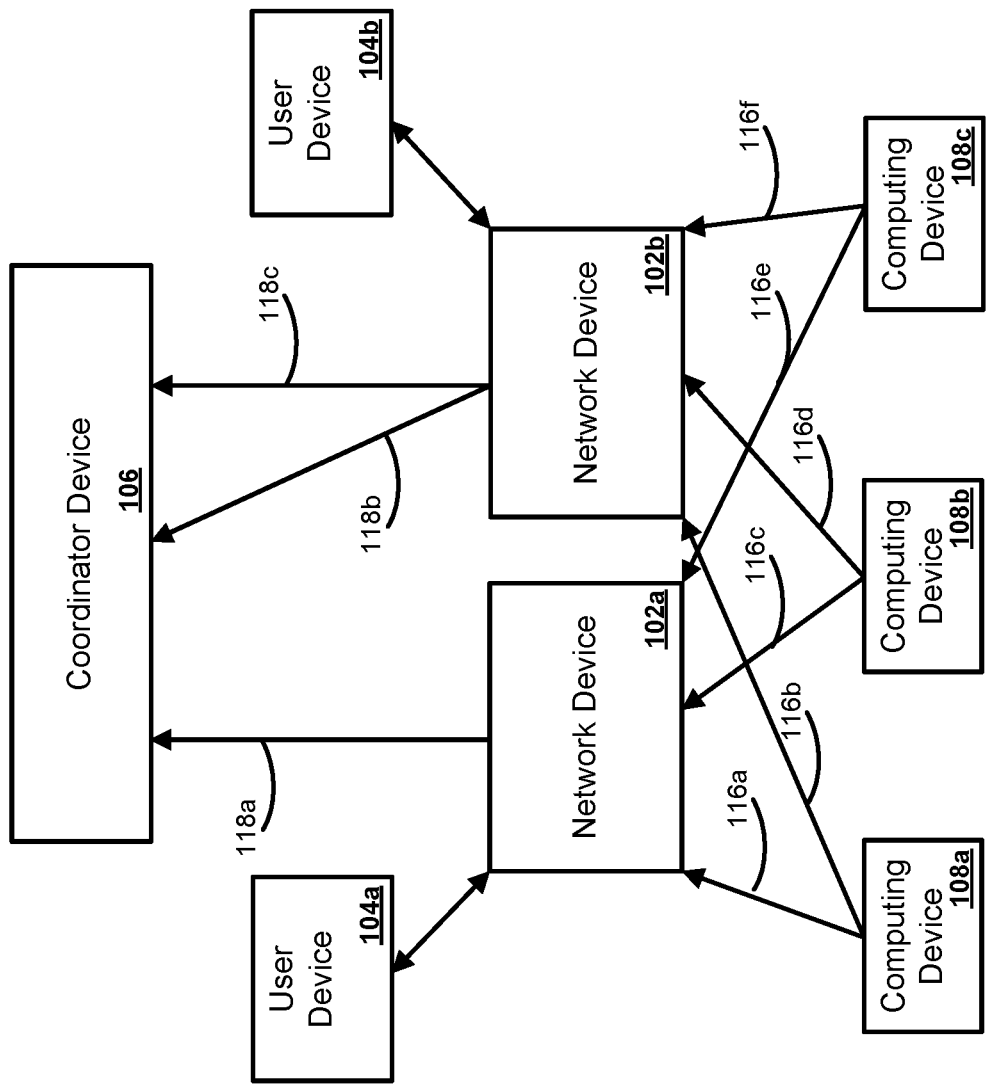
FIG. 1C shows an example system for wireless communication.

As shown in FIG. 1C, the routing table entry generated by the network device 102a may cause the network device 102a, as a default or for an amount of time, to discard or disregard additional data 116c received from/via the computing device 108b and additional data 116e received from/via the computing device 108c. The coordinator device 106 may continue processing data normally during this amount of time. Put differently, the coordinator device 106 may not be affected by the instruction signal 114c, and it may continue sending data to, and/or receiving data from/via, the network device 102a during the amount of time. The network device 102a may continue processing additional data 116a received from/via the computing device 108a. The network device 102a may send a transmission 118a (e.g., a copy of the additional data 116a and/or metadata associated thereto) to/via the coordinator device 106.

As also shown in FIG. 1C, the routing table entry generated by or for the network device 102b may cause the network device 102b, as a default or for an amount of time, to discard or disregard additional data 116b received from/via the computing device 108a. The coordinator device 106 may continue processing data normally during this amount of time (e.g., the coordinator device 106 may continue sending data to, and/or receiving data from/via, the network device 102b during the amount of time). The network device 102a may continue processing additional data 116d received from/via the computing device 108b and additional data 116f received from/via the computing device 108c. The network device 102b may send a transmission 118b (e.g., a copy of the additional data 116d and/or metadata) to/via the coordinator device 106. The network device 102b may send a transmission 118c (e.g., a copy of the additional data 116f and/or metadata associated thereto) to/via the coordinator device 106.

Figure 1D:
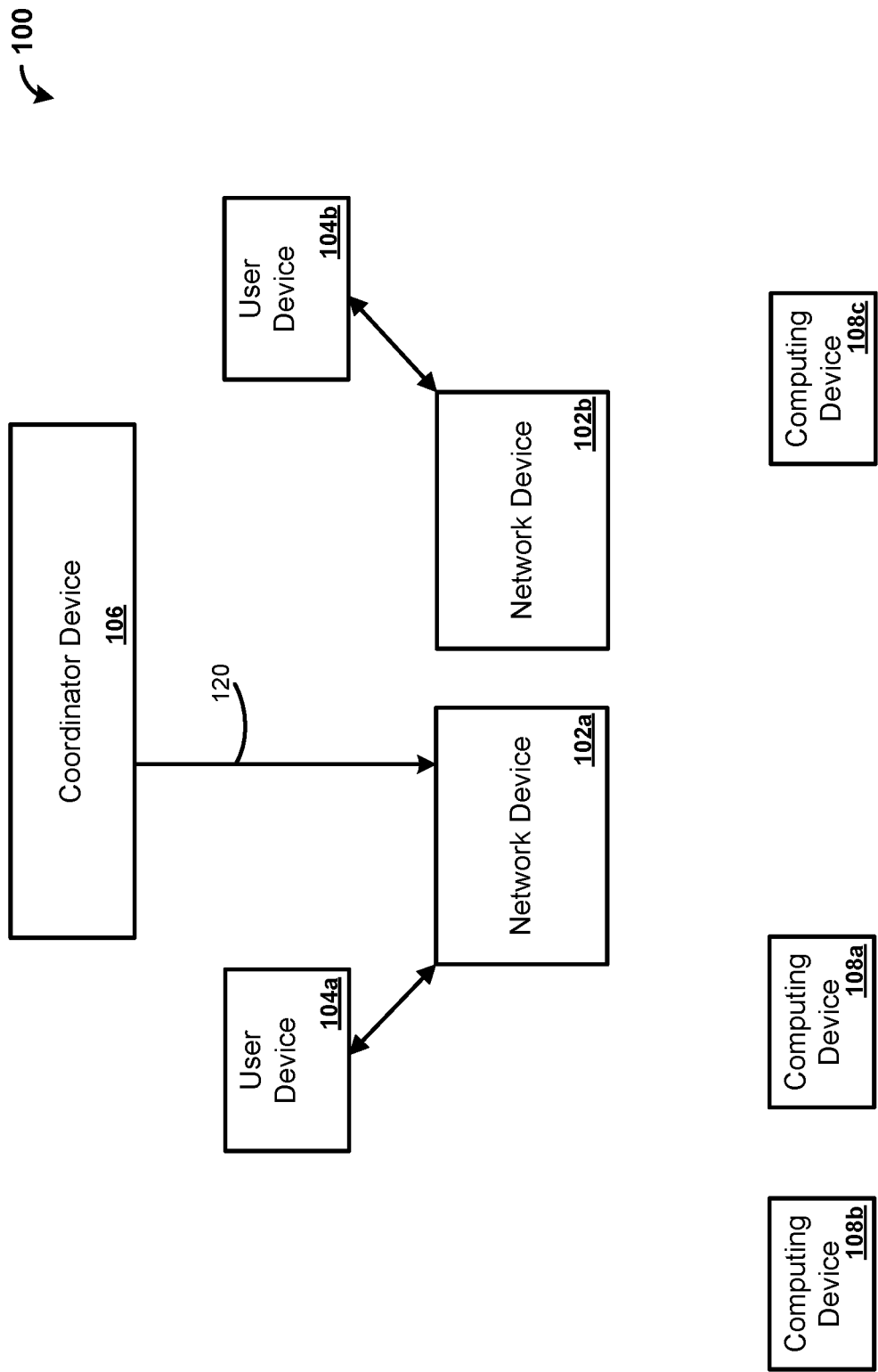
FIG. 1D shows an example system for wireless communication.
Figure 1E:
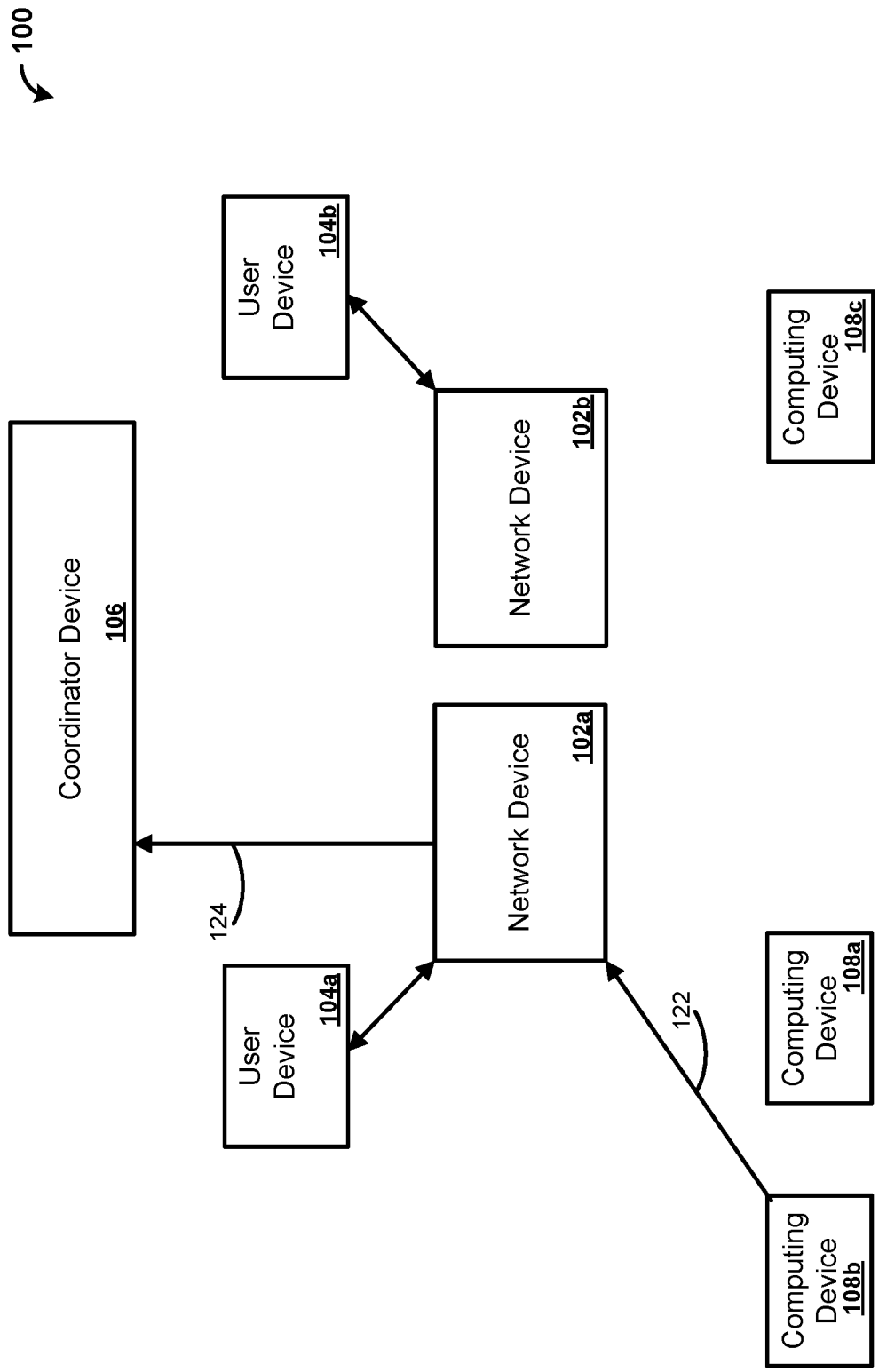
FIG. 1E shows an example system for wireless communication.

As shown in FIG. 1D, the computing device 108b may change position relative to the network devices 102a, 102b. While FIG. 1D shows the computing device 108b as changing position, it is to be understood that any of the computing devices 108a, 108b, 108c may change position relative to either of the network devices 102a, 102b. The computing device 108b may change position such that additional data the computing device 108b sends may not be received by/via the network device 102b. For example, the network device 102b may have been the network device selected (e.g., determined) by the coordinator device 106 to continue processing additional data received from/via the computing device 108b. The coordinator device 106 may determine that the computing device 108b has changed position relative to the network device 102b based on an amount of time during which the coordinator device 106 does not receive additional data from/via the computing device 108b via the network device 102b (e.g., an amount of time during which the network device 102b has not sent to the coordinator device 106 data received from the computing device 108b). The coordinator device 106 may send to/via the network device 102a a signal 120 instructing the network device 102a to remove the generated routing table entry associated with the computing device 108b. The coordinator device 106 may send the signal 120 to/via the network device 102a based on the coordinator device 106 having determined that the computing device 108b has changed position relative to the network device 102b. As shown in FIG. 1E, the signal 120 may cause the network device 102a to resume processing additional data 122 received from/via the computing device 108b. The network device 102a may, based on receiving the signal 120, send a copy of the additional data 122 and/or metadata associated thereto to/via the coordinator device 106 via transmission 124.

Figure 2:
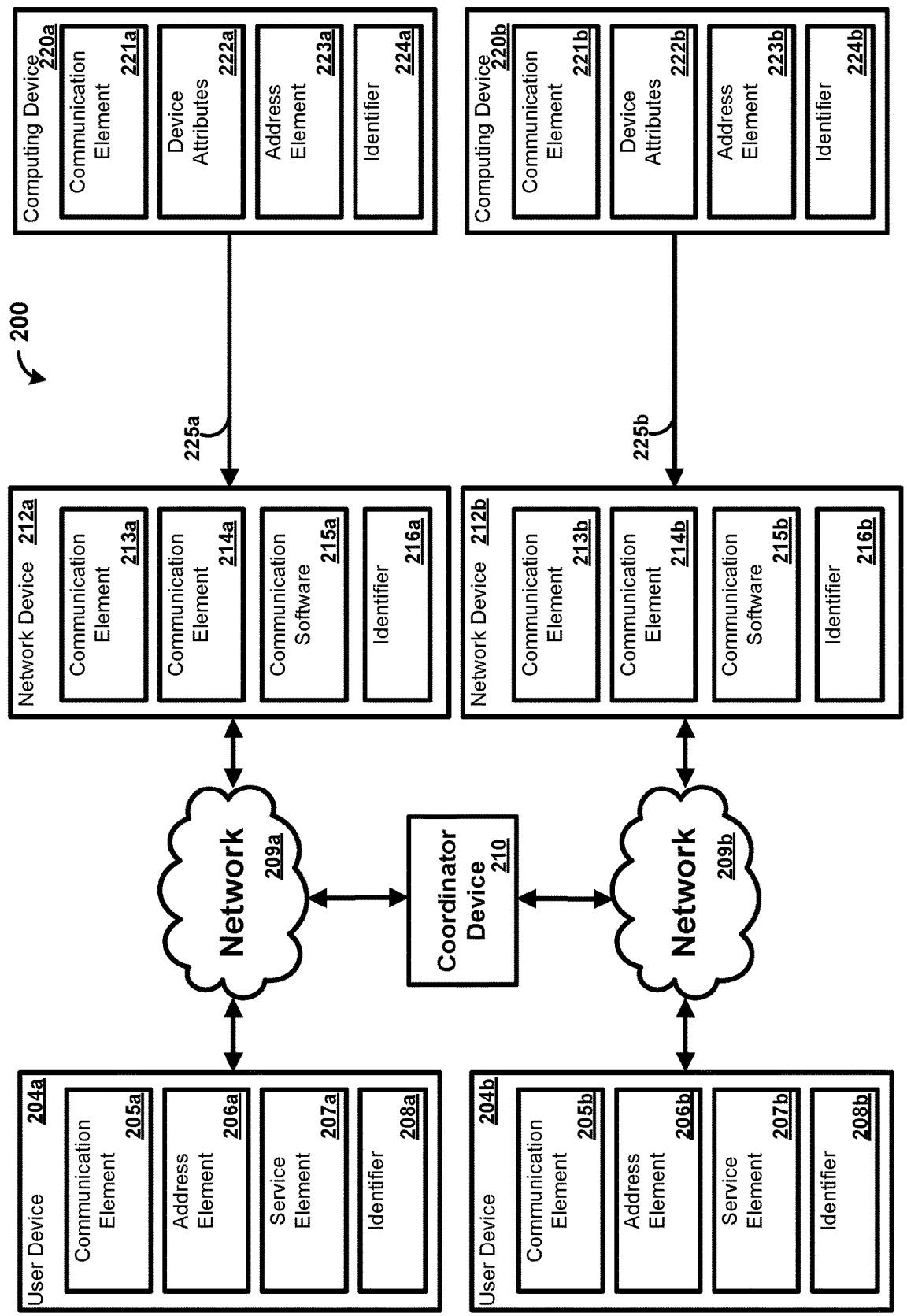
FIG. 2 shows an example system for wireless communication.

FIG. 2 shows a system 200 for wireless communication. Those skilled in the art will appreciate that digital equipment and/or analog equipment may be employed. Once skilled in the art will appreciate that provided herein is a functional description and that the respective functions may be performed by software, hardware, or a combination of software and hardware.

The system 200 may include network devices 212a, 212b, computing devices 220a, 220b, user devices 204a, 204b, networks 209a, 209b, and a coordinator device 210. The network devices 212a, 212b may be, for example, network devices 102a, 102b of FIGS. 1A-1E. The computing devices 220a, 220b may be, for example, computing devices 104a, 104b, 104c of FIGS. 1A-1E. The user devices 204a, 204b may be, for example, user devices 106a, 106b of FIGS.

1A-1E. The coordinator device 210 may be, for example, the coordinator device 106 of FIGS. 1A-1E.

The network devices 212a, 212b may receive, for example via transmissions 225a, 225b, data sent by/via the computing devices 220a, 220b. The transmissions 225a, 225b may be sent by/via the computing devices 220a, 220b using a low-energy network protocol, such as, for example, a ZigBee network protocol; a Bluetooth™ network protocol, a Z-Wave network protocol, a combination thereof, and/or the like. The network devices 212a, 212b may send to the coordinator device 210, via the networks 209a, 209b, data indicative of the transmissions 225a, 225b received by/via the computing devices 220a, 220b. The network device 220a may communicate with the coordinator device 210 via the network 209a. The network device 220b may communicate with the coordinator device 210 via the network 209b. The networks 209a, 209b may each be a Wi-Fi network.

The network devices 212a, 212b may each be configured as a local area network (LAN). The network devices 212a, 212b may each be a dual band wireless communication device. The network devices 212a, 212b may each be a gateway device for communicating with another network, such as a communication network provided by an Internet Service Provider. The network devices 212a, 212b may each be configured with a first service set identifier (SSID) (e.g., associated with a user network or private network) to function as a local network for a particular user or users. The network devices 212a, 212b may each be configured with a second service set identifier (SSID) (e.g., associated with a public/community network or a hidden network) to function as a secondary network or redundant network for connected communication devices. The network devices 212a, 212b may each be configured to allow one or more wireless devices to connect to a wired and/or wireless network using Wi-Fi, Bluetooth, ZigBee, Z-Wave, or any desired method or standard.

The network device 212a may have communication elements 213a, 214a, communication software 215a, and an identifier 216a. The communication elements 213a, 214a may be wireless transceivers configured to transmit and receive wireless communications via a wireless communication network (e.g., the networks 209a,b). The communication elements 213a, 214a may be configured to communicate via a specific network protocol. The communication element 213a may be a wireless transceiver configured to communicate via a Wi-Fi network, and the communication element 214a may be a wireless transceiver configured to communicate via a Wireless Personal Area Network (WPAN). The WPAN may operate using a low-energy network protocol, such as a ZigBee network protocol; a Bluetooth™ network protocol, a Z-Wave network protocol, a combination thereof, and/or the like. The network device 212a may communicate with the coordinator device 210 on the network 209a via the communication element 213a. The network device 212a may receive data (e.g., transmission 225a) from/via the computing device 220a via the communication element 214a.

The network device 212a may have communication software 215a. The communication software 215a may be any combination of firmware, software, and/or hardware. The communication software 215a may facilitate a reception by the network device 212a of the transmission 225a received from/via the computing device 220a in order to facilitate the computing device 220a to send data to the coordinator device 210 via the network device 212a and the network 209a. The communication software 206 may determine one or more attributes of the computing device 220a (e.g., the device attributes 222a). The communication software 206 may generate a routing table entry (e.g., an access control list entry stored in memory of network device 212a) indicative of the identifier 224a for the computing device 220a. The communication software 206 may generate the routing table entry based on an instruction signal, such as the instruction signals 114a, 114b, 114c of FIG. 1B. The instruction signal may be received from/via the coordinator device 210 via the network 209a and the communication element 214a. The instruction signal may be indicative of the identifier 224a for the computing device 220a. The identifier 224a for the computing device 220a may be, for example, a Media Access Control ("MAC") address; an internet protocol ("IP") address; a universal unique identifiers ("UUID"); a combination thereof; and/or the like.

Based on the routing table entry, the communication software may cause the network device 212a to discard or disregard additional transmissions (e.g., data) received from/via the computing device 220a. The communication software 206 may remove the routing table entry after an amount of time has lapsed. The amount of time may be, for example, a number of seconds, a number of minutes, a number of hours, combinations thereof, and/or the like. Removing the routing table entry may cause the network device 212a to process additional transmissions (e.g., data) received from/via the computing device 220a. The communication software 206 may remove the routing table entry based on an instruction signal, such as the instruction signal 120 of FIG. 1D, received from/via the coordinator device 210 via the network 209a and the communication element 214a. The instruction may be, for example, a signal instructing the network device 220a to remove the generated routing table entry associated with the computing device 220a.

The network device 212a may have an identifier 216a. The identifier 216a may be or relate to, for example, an Internet Protocol (IP) Address IPV4/IPV6 or a media access control address (MAC address) or the like. The identifier 216a may be a unique identifier for facilitating wired and/or wireless communications with the network device 212a. The identifier 216a may be associated with a physical location of the network device 212a.

The network device 212b may have communication elements 213b, 214b, communication software 215b, and an identifier 216b. The communication elements 213b, 214b may be wireless transceivers configured to transmit and receive wireless communications via a wireless communication network (e.g., the networks 209a,b). The communication elements 213b, 214b may be configured to communicate via a specific network protocol. The communication element 213b may be a wireless transceiver configured to communicate via a Wi-Fi network, and the communication element 214b may be a wireless transceiver configured to communicate via a WPAN. The WPAN may operate using a low-energy network protocol, such as a ZigBee network protocol; a Bluetooth™ network protocol, a Z-Wave network protocol, a combination thereof, and/or the like. The network device 212b may communicate with the coordinator device 210 on the network 209b via the communication element 213b. The network device 212b may receive data (e.g., transmission 225b) from/via the computing device 220b via the communication element 214b.

The network device 212b may have communication software 215b. The communication software 215b may be any combination of firmware, software, and/or hardware. The communication software 215b may facilitate a reception by the network device 212b of the transmission 225b received from/via the computing device 220b in order to facilitate the computing device 220b sending data to/via the coordinator device 210 via the network device 212b and the network 209b. The communication software 215b may determine one or more attributes of the computing device 220b (e.g., the device attributes 222b).

The communication software 215b may generate a routing table entry (e.g., an access control list entry stored in memory of network device 212b) indicative of the identifier 224b for the computing device 220b. The communication software 215b may generate the routing table entry based on an instruction signal, such as the instruction signals 114a, 114b, 114c of FIG. 1B. The instruction signal may be received from/via the coordinator device 210 via the network 209b and communication element 214b. The instruction signal may be indicative of the identifier 224b for the computing device 220b. The identifier 224b for the computing device 220b may be, for example, a Media Access Control ("MAC") address; an internet protocol ("IP") address; a universal unique identifiers ("UUID"); a combination thereof; and/or the like.

Based on the routing table entry, the communication software 215b may cause the network device 212b to discard or disregard additional transmissions (e.g., data) received from/via the computing device 220b. The communication software 215b may remove the routing table entry after an amount of time has lapsed. The amount of time may be, for example, a number of seconds, a number of minutes, a number of hours, combinations thereof, and/or the like. Removing the routing table entry may cause the network device 212b to process additional transmissions (e.g., data) received from/via the computing device 220b. The communication software 215b may remove the routing table entry based on an instruction signal, such as the instruction signal 120 of FIG. 1D, received from/via the coordinator device 210 via the network 209b and the communication element 214b. The instruction signal received from/via the coordinator device 210 via the network 209b and the communication element 214b may be, for example, a signal instructing the network device 212b to remove the generated routing table entry associated with the computing device 220b.

The network device 212b may have an identifier 216b. The identifier 216b may be or relate to, for example, an Internet Protocol (IP) Address IPV4/IPV6 or a media access control address (MAC address) or the like. The identifier 216b may be a unique identifier for facilitating wired and/or wireless communications with the network device 212b. The identifier 216b may be associated with a physical location of the network device 212b.

The computing device 220a may have a communication element 221a, device attributes 222a, an address element 223a, and an identifier 224a. The computing device 220a may be an electronic device such as a sensor, smart TV, smart speakers, toys, wearable electronics, smart appliance, smart meters, security systems, or other devices capable of communicating with the network device 212a. The communication element 221a may be a wireless transceiver. The communication element 221a may be configured to communicate via a specific network protocol. For example, the communication element 221a may be configured to communicate via a WPAN such as a ZigBee network, a Z-Wave network, a Bluetooth™ network, and the like. The computing device 220a may communicate with the network device 212a via the communication element 221a.

The computing device 220a may have device attributes 222a. The device attributes 222a may indicate one or more attributes about the computing device 220a, such as operating characteristics of the computing device 220a. The device attributes 222a may indicate, for example, a Link Quality Indicator (LQI), a Relative Received Signal Strength (RSSI), a Packet Error Rate (PER), channel selection, potential bands for use by the computing device 220a, channels the computing device 220a may avoid communicating on, a frequency of data transmission, a sleep duration, combinations thereof, and/or the like. The device attributes 222a may indicate how the computing device 220a operates. That is, the device attributes 222a may indicate a frequency at which the computing device 220a communicates with the network device 212a (e.g., via transmission 225a). Further, the device attributes 222a may indicate a power and/or a range associated with the communication element 221a. The computing device 220a may provide the device attributes 222a to/via the network device 212a to facilitate the network device 212a communicating with the coordinator device 210 via the network 209a.

The computing device 220a may have an address element 223a. The address element 223a may be, for example, an internet protocol address, a network address, a media access control ("MAC") address, an Internet address, or the like. The address element 223a may be relied upon to establish a communication session between the computing device 220a and the network device 212a or other devices and/or networks. The address element 223a may be used as an identifier or locator of computing device 220a. The address element 223a may be persistent for a particular network.

The computing device 220a may be associated with a user identifier or device identifier 224a. The device identifier 224a may be any identifier, token, character, string, or the like, for differentiating one user or computing device (e.g., the computing device 220a) from another user or computing device. The device identifier 224a may identify a user or computing device 220a as belonging to a particular class of users or computing devices. The device identifier 224a may indicate information relating to the computing device 220a such as a manufacturer, a model or type of device, a service provider associated with the computing device 220a, a state of the computing device 220a, a locator, and/or a label or a classifier. Other information may be represented by the device identifier 224a.

The computing device 220b may have a communication element 221b, device attributes 222b, an address element 223b, and an identifier 224b. The computing device 220b may be an electronic device such as a sensor, smart TV, smart speakers, toys, wearable electronics, smart appliance, smart meters, security systems, or other devices capable of communicating with the network device 212b. The communication element 221b may be configured to communicate via a specific network protocol. The communication element 221b may be a wireless transceiver configured to communicate via a WPAN. The WPAN may operate using a low-energy network protocol, such as a ZigBee network, a Z-Wave network, a Bluetooth™ network, and the like. The computing device 220b may communicate with the network device 212b via the communication element 221b.

The computing device 220b may have device attributes 222b. The device attributes 222b may indicate one or more attributes about the computing device 220b, such as operating characteristics of the computing device 220b. The device attributes 222b may indicate, for example, a Link Quality Indicator (LQI), a Relative Received Signal Strength (RSSI), a Packet Error Rate (PER), channel selection, potential bands for use by the computing device 220b, channels the computing device 220b may avoid communicating on, frequency of data transmission, a sleep duration, combinations thereof, and/or the like. The device attributes 222*b* may indicate how the computing device 220*b* operates. That is, the device attributes 222*b* may indicate a frequency at which the computing device 220*b* communicates with the network device 212*b* (e.g., via transmission 225*a*). Further, the device attributes 222*b* may indicate a power and/or a range associated with the communication element 221*b*. The computing device 220*b* may provide the device attributes 222*b* to/via the network device 212*b* to facilitate the network device 212*b* communicating with the coordinator device 210 via the network 209*b*.

The computing device 220*b* may have an address element 223*b*. The address element 223*b* may be an internet protocol address, a network address, a media access control ("MAC") address, an Internet address, or the like. The address element 223*b* may be relied upon to establish a communication session between the computing device 220*b* and the network device 212*b* or other devices and/or networks. The address element 223*b* may be used as an identifier or locator of the computing device 220*b*. The address element 223*b* may be persistent for a particular network.

The computing device 220*b* may be associated with a user identifier or device identifier 224*b*. The device identifier 224*b* may be any identifier, token, character, string, or the like, for differentiating one user or computing device (e.g., the computing device 220*b*) from another user or computing device. The device identifier 224*b* may identify a user or computing device 220*b* as belonging to a particular class of users or computing devices. The device identifier 224*b* may indicate information relating to the computing device 220*b* such as a manufacturer, a model or type of device, a service provider associated with the computing device 220*b*, a state of the computing device 220*b*, a locator, and/or a label or a classifier. Other information may be represented by the device identifier 224*b*.

The user device 204*a* may have a communication element 205*a*, an address element 206*a*, a service element 207*a*, and an identifier 208*a*. The user device 204*a* may be an electronic device such as a computer, a smartphone, a laptop, a tablet, a set top box, a display device, or other device capable of communicating with the network device 212*a*. The communication element 205*a* may be a wireless transceiver configured to transmit and receive wireless communications via a wireless network (e.g., the network 209*a*). The communication element 205*a* may be configured to communicate via one or more wireless networks. The communication element 205*a* may be configured to communicate via a specific network protocol. The communication element 205*a* may be a wireless transceiver configured to communicate via a Wi-Fi network (e.g., network 209*a*). The user device 204*a* may communicate with the network device 212*a* on the network 209*a* via the communication element 205*a*.

The user device 204*a* may have an address element 206*a* and a service element 207*a*. The address element 206*a* may comprise or provide an internet protocol address, a network address, a media access control (MAC) address, an Internet address, or the like. The address element 206*a* may be relied upon to establish a communication session between the user device 204*a* and the network device 212*a* or other devices and/or networks. The address element 206*a* may be used as an identifier or locator of the user device 204*a*. The address element 206*a* may be persistent for a particular network (e.g., the network 209*a*).

The service element 207*a* may comprise an identification of a service provider associated with the user device 204*a* and/or with the class of user device 204*a*. The class of the user device 204*a* may be related to a type of device, capability of device, type of service being provided, and/or a level of service. The level of service may be, for example, business class, service tier, service package a combination thereof; and/or the like. The service element 207*a* may comprise information relating to or provided by a communication service provider (e.g., Internet service provider) that is providing or enabling data flow such as communication services to the user device 204*a*. The service element 207*a* may comprise information relating to a preferred service provider for one or more particular services relating to the user device 204*a*. The address element 206*a* may be used to identify or retrieve data from/via the service element 207*a*, or vice versa. One or more of the address element 206*a* or the service element 207*a* may be stored remotely from the user device 204*a*. Other information may be represented by the service element 207*a*.

The user device 204*a* may be associated with a user identifier or a device identifier 208*a*. The device identifier 208*a* may be any identifier, token, character, string, or the like, for differentiating one user or computing device (e.g., the user device 204*a*) from another user or computing device. The device identifier 208*a* may identify a user or computing device as belonging to a particular class of users or computing devices. The device identifier 208*a* may comprise information relating to the user device 204*a* such as a manufacturer, a model or type of device, a service provider associated with the user device 204*a*, a state of the user device 204*a*, a locator, and/or a label or classifier. Other information may be represented by the device identifier 208*a*.

The user device 204*a* may have a communication element 205*b*, an address element 206*b*, a service element 207*b*, and an identifier 208*b*. The user device 204*a* may be an electronic device such as a computer, a smartphone, a laptop, a tablet, a set top box, a display device, or other device capable of communicating with the network device 212*b*. The communication element 205*b* may be a wireless transceiver configured to transmit and receive wireless communications via a wireless network (e.g., the network 209*b*). The communication element 205*b* may be configured to communicate via one or more wireless networks. The communication element 205*b* may be configured to communicate via a specific network protocol. The communication element 205*b* may be a wireless transceiver configured to communicate via a Wi-Fi network (e.g., network 209*b*). The user device 204*a* may communicate with the network device 212*b* on the network 209*b* via the communication element 205*b*.

The user device 204*a* may have an address element 206*b* and a service element 207*b*. The address element 206*b* may comprise or provide an internet protocol address, a network address, a media access control (MAC) address, an Internet address, or the like. The address element 206*b* may be relied upon to establish a communication session between the user device 204*a* and the network device 212*b* or other devices and/or networks. The address element 206*b* may be used as an identifier or locator of the user device 204*a*. The address element 206*b* may be persistent for a particular network (e.g., the network 209*b*).

The service element 207*b* may comprise an identification of a service provider associated with the user device 204*a* and/or with the class of user device 204*a*. The class of the user device 204*a* may be related to a type of device, capability of device, type of service being provided, and/or a level of service. The level of service may be, for example, business class, service tier, service package, a combination thereof; and/or the like. The service element 207*b* may comprise information relating to or provided by a communication service provider (e.g., Internet service provider) that is providing or enabling data flow such as communication services to the user device 204a. The service element 207b may comprise information relating to a preferred service provider for one or more particular services relating to the user device 204a. The address element 206b may be used to identify or retrieve data from/via the service element 207b, or vice versa. One or more of the address element 206b or the service element 207b may be stored remotely from the user device 204a. Other information may be represented by the service element 207b.

The user device 204a may be associated with a user identifier or device identifier 208b. The device identifier 208b may be any identifier, token, character, string, or the like, for differentiating one user or computing device (e.g., the user device 204a) from another user or computing device. The device identifier 208b may identify a user or computing device as belonging to a particular class of users or computing devices. The device identifier 208b may comprise information relating to the user device 204a such as a manufacturer, a model or type of device, a service provider associated with the user device 204a, a state of the user device 204a, a locator, and/or a label or classifier. Other information may be represented by the device identifier 208b.

Figure 3:
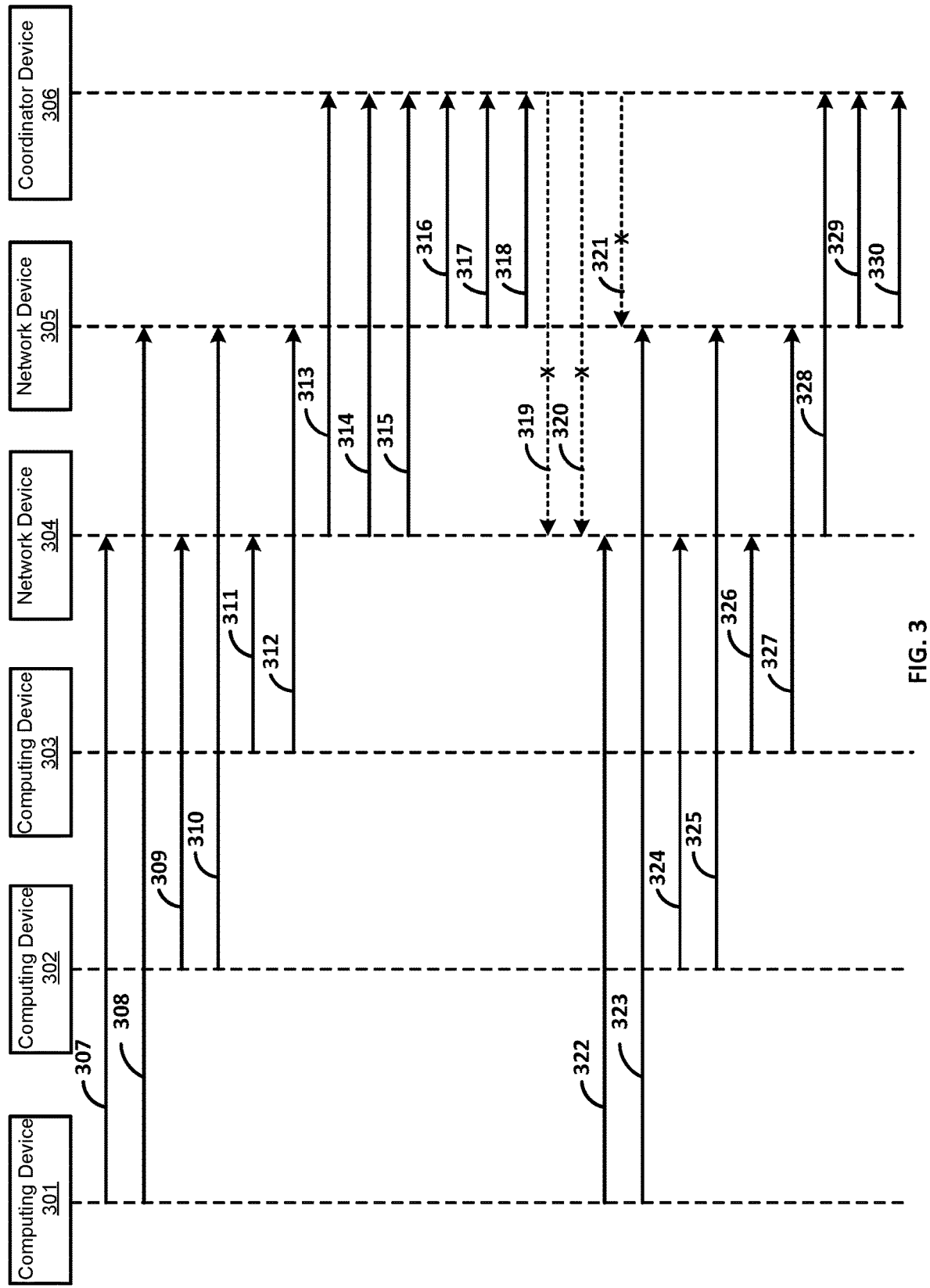
FIG. 3 shows example communication flows for an example system for wireless communication.

FIG. 3 shows a plurality of communication flows that the system 100 of FIGS. 1A-1E or the system 200 of FIG. 2 may implement when facilitating wireless communication in accordance with the present description. At communication flow 307, a computing device 301 (e.g., computing devices 108a, 108b, 108c of FIGS. 1A-1E or computing devices 220a, 220b of FIG. 2) may send a data transmission (e.g., a packet(s), beacon, data 110a,b,c,d,e,f, etc.) that may be received by/via a network device 304 (e.g., network devices 102a, 102b of FIGS. 1A-1E or network devices 212a, 212b of FIG. 2). At communication flow 308, the data transmission sent by the computing device 301 may be received by/via a network device 305 (e.g., network devices 102a, 102b of FIGS. 1A-1E or network devices 212a, 212b of FIG. 2).

At communication flow 309, a computing device 302 (e.g., computing devices 108a, 108b, 108c of FIGS. 1A-1E or computing devices 220a, 220b of FIG. 2) may send a data transmission (e.g., a packet, beacon, data 110a,b,c,d,e,f, etc.) that may be received by/via the network device 304. At communication flow 310, the data transmission sent by the computing device 302 may be received by/via the network device 305. At communication flow 311, a computing device 303 (e.g., computing devices 108a, 108b, 108c of FIGS. 1A-1E or computing devices 220a, 220b of FIG. 2) may send a data transmission (e.g., a packet, beacon, data 110a, b,c,d,e,f, etc.) that may be received by/via the network device 304. At communication flow 312, the data transmission sent by the computing device 303 may be received by/via the network device 305.

At communication flow 313 the network device 304 may send a data transmission to a coordinator device 306 (e.g., coordinator device 106 of FIGS. 1A-1E or coordinator device 210 of FIG. 2). The data transmission sent at communication flow 313 may be indicative of the data received by/via the network device 304 from/via the computing device 301. The data transmission sent at communication flow 313 may be indicative of one or more network parameters associated with the computing device 301 and/or the network device 304. At communication flow 314 the network device 304 may send a data transmission to/via the coordinator device 306 indicative of the data received by/via the network device 304 from/via the computing device 301. The data transmission sent at communication flow 314 may be indicative of one or more network parameters associated with the computing device 301 and/or the network device 304. At communication flow 315 the network device 304 may send a data transmission to/via the coordinator device 306 indicative of the data received by/via the network device 304 from/via the computing device 303. The data transmission sent at communication flow 315 may be indicative of one or more network parameters associated with the computing device 303 and/or the network device 304.

At communication flow 316 the network device 305 may send a data transmission to/via the coordinator device 306 indicative of the data received by/via the network device 305 from/via the computing device 301. The data transmission sent at communication flow 316 may be indicative of one or more network parameters associated with the computing device 301 and/or the network device 305. At communication flow 317 the network device 305 may send a data transmission to/via the coordinator device 306 indicative of the data received by/via the network device 305 from/via the computing device 302. The data transmission sent at communication flow 317 may be indicative of one or more network parameters associated with the computing device 302 and/or the network device 304. At communication flow 318 the network device 305 may send a data transmission to/via the coordinator device 306 indicative of the data received by/via the network device 305 from/via the computing device 303. The data transmission sent at communication flow 318 may be indicative of one or more network parameters associated with the computing device 303 and/or the network device 305.

The coordinator device 306 may determine (e.g., select), based on the one or more network parameters received from/via the network devices 304, 305, one or both of the network devices 304, 305 to process additional data received by/via the network devices 304, 305 from/via each of the computing devices 301, 302, 303. The additional data sent by a given computing device 301, 302, 303 may be processed by one, or more than one, network device 304, 305. At communication flow 319, based on the determination, the coordinator device 306 may send an instruction signal to the network device 304. The instruction signal sent at communication flow 319 may be indicative of an identifier for the computing device 302. The identifier for computing device 302 may be, for example, a Media Access Control ("MAC") address; an internet protocol ("IP") address; a universal unique identifiers ("UUID"); a combination thereof; and/or the like. At communication flow 320, the coordinator device 306 may send an instruction signal to the network device 304. The instruction signal sent at communication flow 320 may be indicative of an identifier for the computing device 303. The identifier for computing device 303 may be, for example, a Media Access Control ("MAC") address; an internet protocol ("IP") address; a universal unique identifiers ("UUID"); a combination thereof; and/or the like.

The instruction signal sent at communication flow 319 may cause the network device 304 to generate a first routing table entry (e.g., an access control list entry stored in memory of network device 304) indicative of the identifier for the computing device 302. The instruction signal sent at communication flow 320 may cause network device 304 to generate a second routing table entry (e.g., an access control list entry stored in memory of network device 304) indicative of the identifier for the computing device 303.

At communication flow 321, the coordinator device 306 may send an instruction signal to the network device 305. The instruction signal sent at communication flow 321 may be indicative of an identifier for the computing device 301. The identifier for the computing device 301 may be, for example, a Media Access Control ("MAC") address; an internet protocol ("IP") address; a universal unique identifiers ("UUID"); a combination thereof; and/or the like. The instruction signal sent at communication flow 321 may cause the network device 305 to generate a routing table entry (e.g., an access control list entry stored in memory of network device 305) indicative of the identifier for the computing device 301.

At communication flow 322, the computing device 301 may send additional data (e.g., a packet, beacon, data 116a,b,c,d,e,f, etc.) that may be received by/via the network device 304. At communication flow 323, the additional data sent by the computing device 301 may be received by/via the network device 305. At communication flow 324, the computing device 302 may send additional data (e.g., a packet, beacon, data 116a,b,c,d,e,f, etc.) that may be received by/via the network device 304. At communication flow 325, the additional data sent by the computing device 302 may be received by/via the network device 305. At communication flow 326, the computing device 303 may send additional data (e.g., a packet, beacon, data 116a,b,c,d,e,f, etc.) that may be received by/via the network device 304. At communication flow 327, the additional data sent by the computing device 303 may be received by/via the network device 305.

The routing table entry generated by network device 304 may cause the network device 304, for an amount of time, to discard or disregard the additional data received from/via the computing device 302 and the additional data received from/via the computing device 303. The network device 304 may process the additional data received from/via the computing device 301, and at communication flow 318 the network device 304 may send a transmission (e.g., a copy of the additional data received from/via computing device 301 and/or metadata) to/via the coordinator device 306. The routing table entry generated by the network device 305 may cause the network device 305, for an amount of time, to discard or disregard the additional data received from/via the computing device 301. The coordinator device 306 may continue processing data normally during this amount of time. Put differently, the coordinator device 306 may not be affected by the instruction signal sent at communication flow 321, and it may continue sending data to, and/or receiving data from/via, the network device 102a during the amount of time. The network device 305 may continue processing the additional data received from/via the computing device 302 and the additional data received from/via the computing device 303, and at communication flow 329 the network device 305 may send a transmission (e.g., a copy of the additional data received from/via computing device 302 and/or metadata) to/via the coordinator device 306. At communication flow 330 the network device 305 may send a transmission (e.g., a copy of the additional data received from/via computing device 303 and/or metadata) to/via the coordinator device 306.

Figure 4:
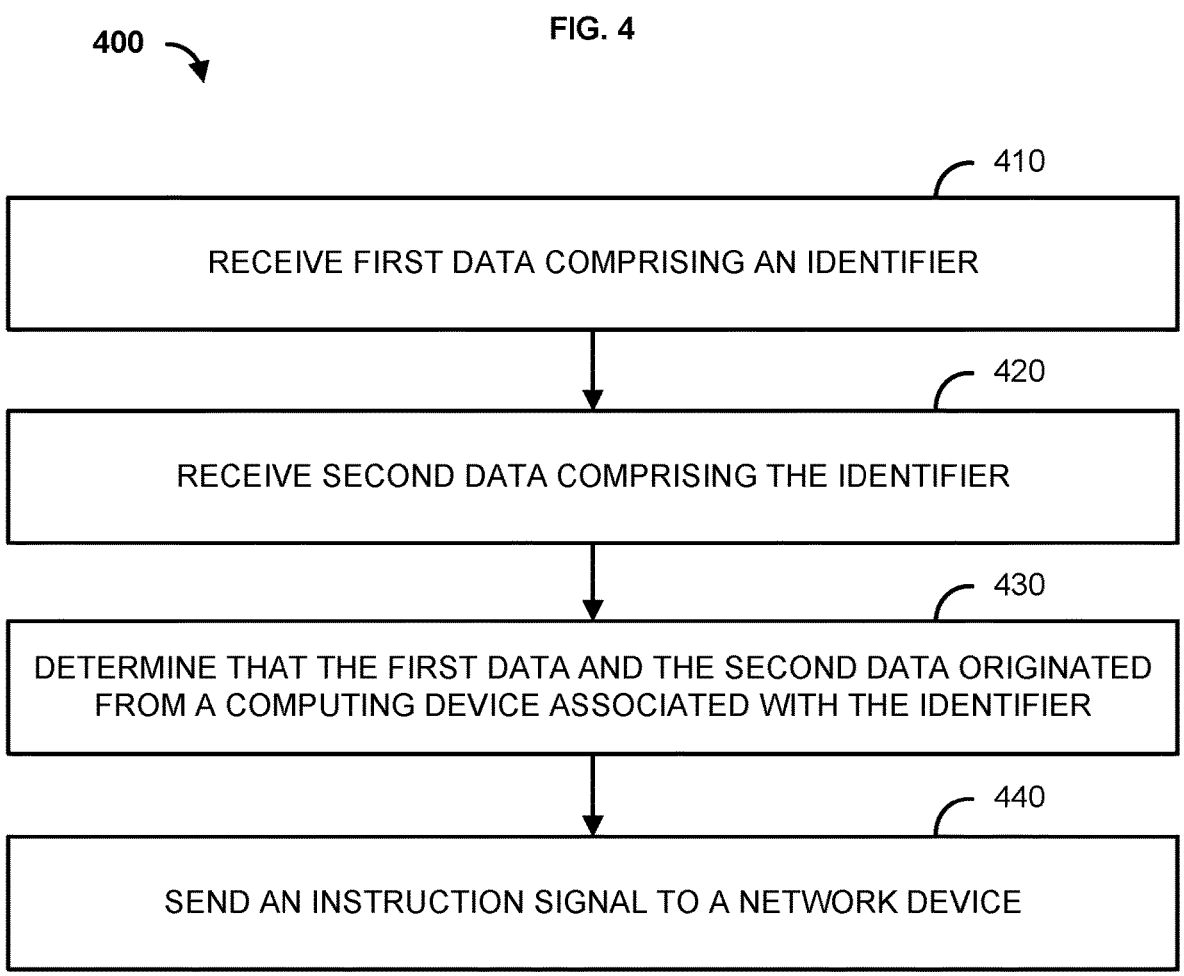
FIG. 4 shows a flowchart of an example method for wireless communication.

FIG. 4 is a flowchart of a method 400 for wireless communication. At step 410, first data (e.g., a packet, beacon, data 110a,b,c,d,e,f, etc.) may be received (e.g., by a coordinator device 106, 210, 306). The first data may be received from/via a first network device (e.g., network devices 102a, 102b of FIGS. 1A-1E; network devices 212a, 212b of FIG. 2; or network devices 304, 305 of FIG. 3). The first data may be indicative of an identifier (e.g., identifier 224a, 224b) associated with a source of the first data (e.g., any of the computing devices shown in FIGS. 1-3).

At step 420, second data (e.g., a packet, beacon, data 110a,b,c,d,e,f, etc.) may be received (e.g., by the coordinator device). The second data may be received from/via a second network device (e.g., network devices 102a, 102b of FIGS. 1A-1E; network devices 212a, 212b of FIG. 2; or network devices 304, 305 of FIG. 3). The second data may be indicative of the identifier (e.g., identifier 224a, 224b) associated with the source of the second data (e.g., any of the computing devices shown in FIGS. 1-3).

At step 430, it may be determined (e.g., by the coordinator device) that the first data and the second data each originated from/via a single source (e.g., any of the computing devices shown in FIGS. 1-3) associated with the identifier. The determination may be based on the first data and the second data each indicating the identifier. The source of the first data and the second data may be a low-energy computing device, such as, for example, a ZigBee device, a Bluetooth™ device, a Z-Wave device, a combination thereof, and/or the like. The identifier may be, for example, a media access control (MAC) address, an internet protocol (IP) address, a universal unique identifier (UUID), a combination thereof, and/or the like.

At step 440, a first instruction signal (e.g., instruction signal 114a,b,c or instruction signal 319, 320, 321) may be sent (e.g., by the coordinator device) to/via the second network device. The first instruction signal may be sent based on the determination that the first data and the second data each originated from/via the source. The first instruction signal may be indicative of the identifier of the source. The first instruction signal may cause the second network device to generate a routing table entry indicative of the identifier. The routing table entry may cause the second network device, for a period of time, to discard or disregard additional data (e.g., additional data 116a,b,c,d,e,f) received from/via the source. The period of time may be an amount of seconds, minutes, hours, combinations thereof, and/or the like.

The computing device may change position relative to the first network device. For example, the first network device may be a gateway, such as a router, and the computing device may be a moveable device, such as a mobile device, sensor, computer, etc. The computing device may change position relative to the first network device such that the first network device no longer receives data via the computing device. It may be determined that the computing device changed position relative to the first network device based on an elapsed amount of time during which no additional data is received from the computing device via the first network device. The elapsed amount of time may be an amount of time, such as a number of seconds, minutes, hours, etc., that is less than the period of time. A second instruction signal may be sent to the second network device based on the determination that the computing device changed position. The second instruction signal may cause the second network device to remove the generated routing table entry. Additional data comprising the identifier may be received via the second network device (e.g., in response to the second network device processing additional data received via/from the computing device after the generated routing table entry is removed).

Figure 5:
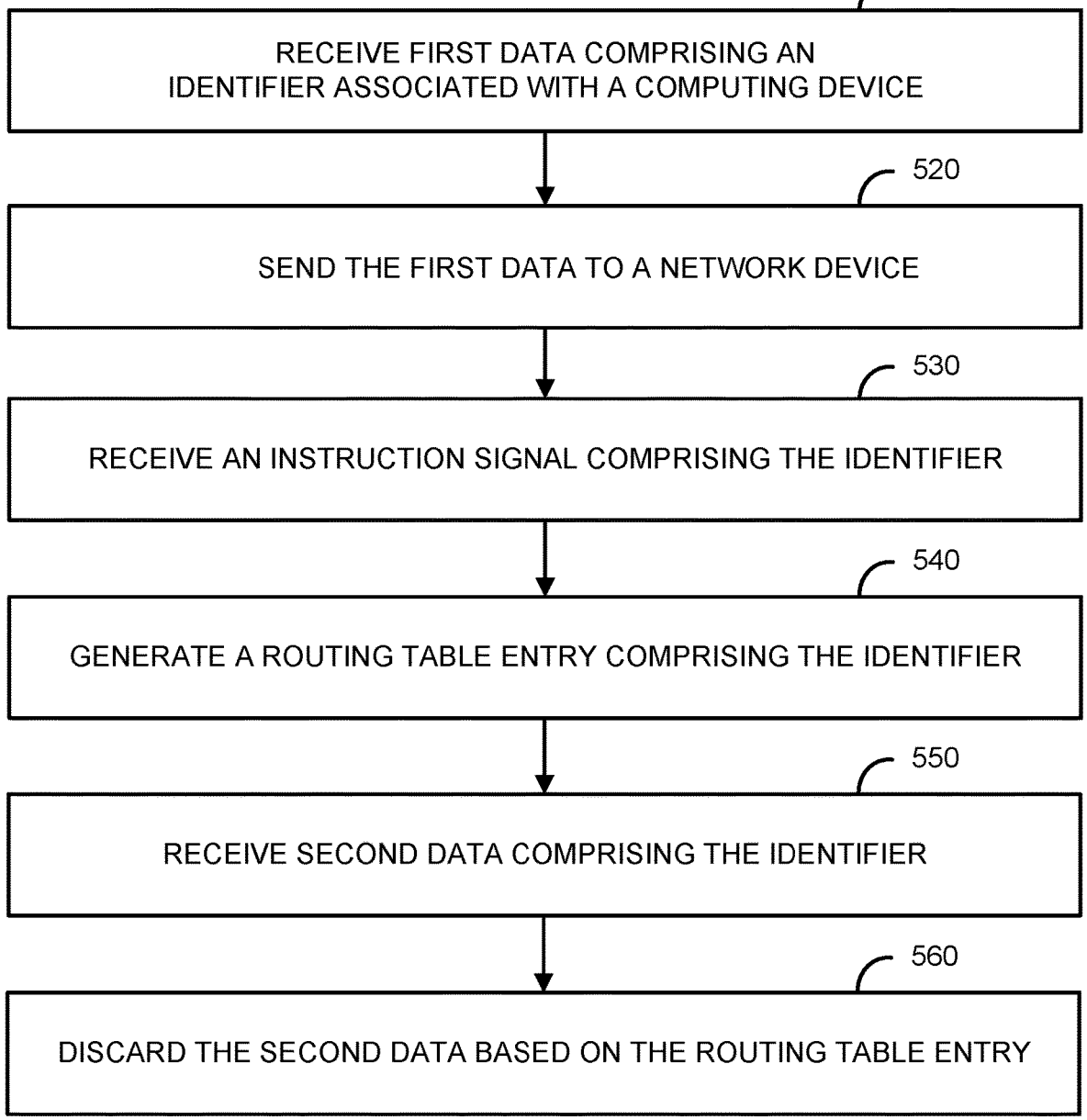
FIG. 5 shows a flowchart of an example method for wireless communication.

FIG. 5 is a flowchart of a method 500 for wireless communication. At step 510, first data (e.g., a packet, beacon, data 110a,b,c,d,e,f, etc.) may be received (e.g., by a downstream network device, such as one of network devices 102*a*, 102*b* of FIGS. 1A-1E; network devices 212*a*, 212*b* of FIG. 2; or network devices 304, 305 of FIG. 3) from/via a computing device (e.g., any of the computing devices shown in FIGS. 1-3). The computing device may operate on a low-energy communication protocol such as, for example, a ZigBee network, a Z-wave network, a Bluetooth™ network, a combination thereof, and/or the like. The first data may indicate an identifier (e.g., identifier 224*a*, 224*b*) associated with the computing device. The identifier may be, for example, a media access control (MAC) address, an internet protocol (IP) address, a universal unique identifier (UUID), a combination thereof, and/or the like.

At step 520, the first data may be sent (e.g., by the downstream network device) to a first network device. The first network device may be an upstream network node (e.g., coordinator device 106, 210, 306). At step 530, a first instruction signal (e.g., instruction signal 114*a,b,c* or instruction signal 319, 320, 321) may be received. The first instruction signal may be received from/via the first network device. The first instruction signal may indicate the identifier associated with the computing device. At step 540, a routing table entry may be generated. The routing table entry may be generated based on the first instruction signal. The routing table entry may be indicative of the identifier associated with the computing device. The routing table entry may be associated with a connection path between the computing device and the upstream network node.

At step 550, second data (e.g., a packet, beacon, data 110*a,b,c,d,e,f*, etc.) may be received (e.g., by the downstream network device). The second data may be received from/via the computing device. The second data may indicate the identifier associated with the computing device. The first data and/or the second data may be indicative of one or more network parameters associated with the computing device. The one or more network parameters may be a WiFi channel and utilization; a ZigBee channel and utilization; a Z-Wave channel and utilization; a Bluetooth™ utilization; a signal strength associated with one or more of the computing devices; system resource utilization; a determined level of interference associated with communications with a user device; a determined distance from/via a computing device; a combination thereof; and/or the like.

At step 560, the second data may be discarded or disregarded (e.g., by the downstream network node). The second data may be discarded or disregarded based on the routing table entry (e.g., indicating that data associated with the identifier is not to be processed). The first instruction signal may indicate a timeout element (e.g., an indication of an amount of time for which the downstream network device is to maintain/store the routing table entry). Third data may be received from/via the computing device. The third data may indicate the identifier associated with the computing device. The third data may not be discarded or disregarded (e.g., it may be processed by the downstream network device) based on the timeout element (e.g., the amount of time having lapsed). The third data may be sent to/via the first network device (e.g., processed by the downstream network device). Based on the determination not to discard or disregard the third data, the routing table entry may be modified (e.g., deleted from memory of the downstream network device). The modified routing table entry may cause additional data received from/via the computing device to be processed.

A second instruction signal may be received from/via the first network device. The second instruction signal may be sent from/via the first network device based on a determination by the first network device that the computing device changed position. For example, the computing device may initially be proximate to a second network device such as a gateway, router, etc., and the computing device may be a moveable device, such as a mobile device, sensor, computer, etc. The computing device may change position relative to the second network device such that the second network device no longer receives data from/via the computing device. It may be determined by the first network device that the computing device changed position relative to the second network device based on an elapsed amount of time during which no additional data is received by the first network device from the computing device via the second network device. Based on receiving the second instruction signal, the routing table entry may be removed. Removing the routing table entry may cause additional data received via/from the computing device to be processed.

FIG. 6 is a flowchart of a method 600 for wireless communication. At step 610, a plurality of packets of data (e.g., a packet, beacon, data 110*a,b,c,d,e,f*, etc.) may be received by a coordinator device (e.g., a backhaul network device) from/via each of a plurality of network devices (e.g., network devices 102*a*, 102*b* of FIGS. 1A-1E; network devices 212*a*, 212*b* of FIG. 2; or network devices 304, 305 of FIG. 3). Each of the plurality of packets of data may have been received by/via each of the plurality of network devices from/via a computing device (e.g., any of the computing devices shown in FIGS. 1-3). Each of the plurality of packets of data may indicate an identifier associated with the computing device (e.g., identifier 224*a*, 224*b*). The identifier may be, for example, a media access control (MAC) address, an internet protocol (IP) address, a universal unique identifier (UUID), a combination thereof, and/or the like.

At step 620, at least one network device of the plurality of network devices may be determined (e.g., selected) to process additional data (e.g., additional data 116*a,b,c,d,e,f*) received from/via the computing device. The determination may be based on reducing redundant processing of duplicate data on a backhaul portion of a communication network. The determination may be based on one or more network parameters associated with the computing device and/or the at least one network device. The one or more network parameters may be received in tandem with, or separately from, the data received. The one or more network parameters may be a WiFi channel and utilization; a ZigBee channel and utilization; a Z-Wave channel and utilization; a Bluetooth™ utilization; a signal strength associated with one or more of the computing devices; system resource utilization; a determined level of interference associated with communications with a user device (e.g., due to communication with a user device and/or distance from a computing device); a combination thereof, and/or the like.

At step 630, a first instruction signal (e.g., instruction signal 114*a,b,c* or instruction signal 319, 320, 321) may be sent to/via the remaining network devices of the plurality of network devices (e.g., those not selected to continue processing additional data received from/via the computing device). The first instruction signal may indicate the identifier associated with the computing device. The first instruction signal may cause each of the remaining network devices of the plurality of network devices to generate a routing table entry indicative of the identifier. Each routing table entry may cause each of the remaining network devices, for a period of time, to discard or disregard additional data (e.g., additional data 116*a,b,c,d,e,f*) received from/via the computing device. The period of time may be an amount of seconds, minutes, hours, combinations thereof, and/or the like.

The computing device may change position relative to the at least one network device. For example, the at least one network device may be a gateway, such as a router, and the computing device may be a moveable device, such as a mobile device, sensor, computer, etc. The computing device may change position relative to the at least one network device such that the at least one network device no longer receives data via the computing device. It may be determined that the computing device changed position relative to the at least one network device based on an elapsed amount of time during which no additional data is received from the computing device via the fir at least one network device. The elapsed amount of time may be an amount of time, such as a number of seconds, minutes, hours, etc., that is less than the period of time. A second instruction signal may be sent to at least one of the remaining network devices based on the determination that the computing device changed position. The second instruction signal may cause the at least one of the remaining network devices to remove the generated routing table entry. Additional data comprising the identifier may be received via the at least one of the remaining network devices (e.g., in response to the at least one of the remaining network devices processing additional data received from/via the computing device after the generated routing table entry is removed).

Figure 7:
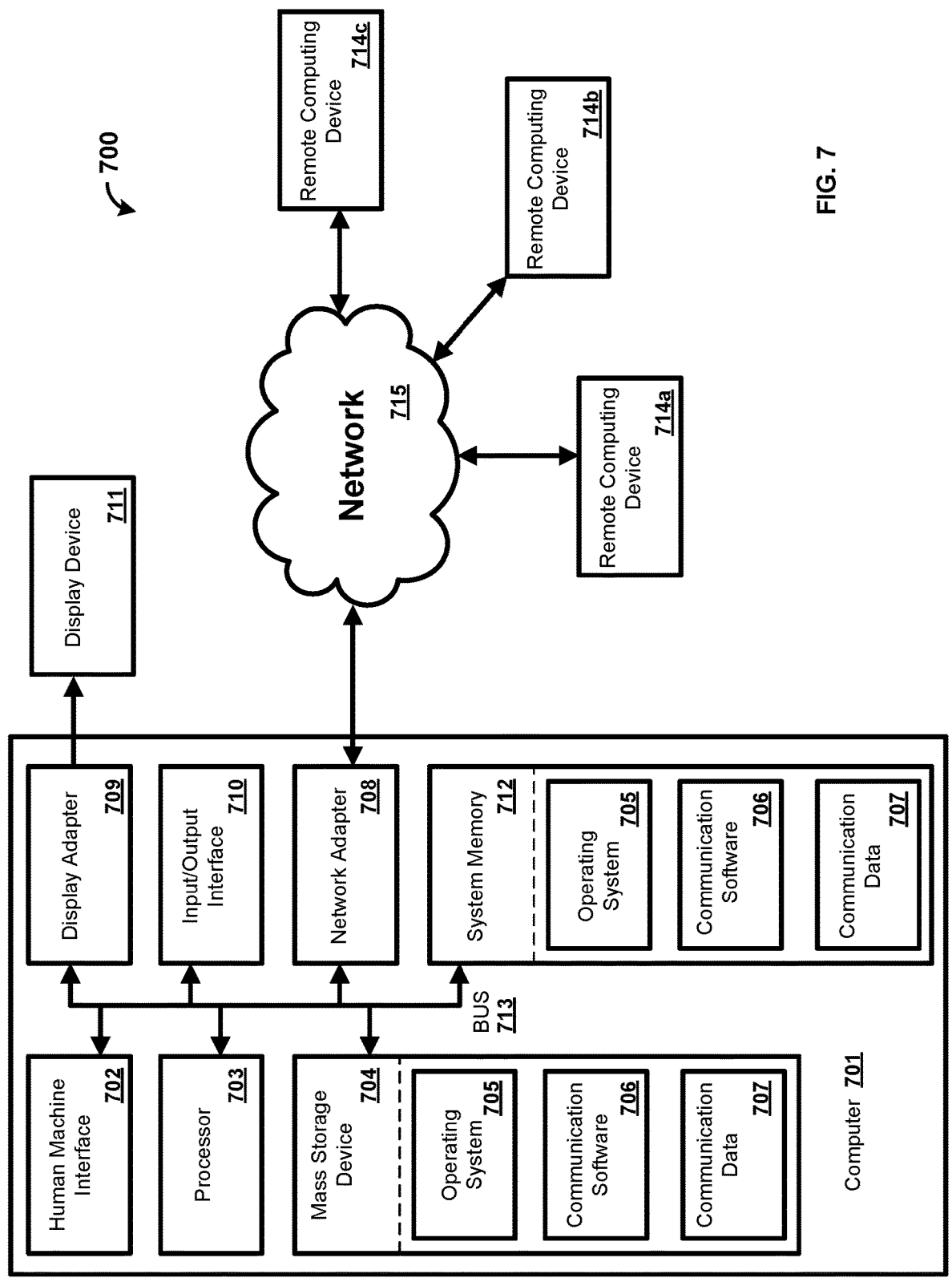
FIG. 7 shows a block diagram of an example computing device for wireless communication.

FIG. 7 shows a system 700 for wireless communication. Any of the computing devices shown in FIGS. 1-3, the user devices shown in FIGS. 1A-1E and in FIG. 2, the network devices 102a, 102b of FIGS. 1A-1E, the network devices 212a, 212b of FIG. 2, the network devices 304, 305 of FIG. 3 and/or the coordinator device 106, 210, 306 may be a computer 701 as shown in FIG. 7. The computer 701 may comprise one or more processors 703, a system memory 712, and a bus 713 that couples various system components including the one or more processors 703 to the system memory 712. In the case of multiple processors 703, the computer 701 may utilize parallel computing. The bus 713 is one or more of several possible types of bus structures, including a memory bus or memory controller, a peripheral bus, an accelerated graphics port, or local bus using any of a variety of bus architectures.

The computer 701 may operate on and/or comprise a variety of computer readable media (e.g., non-transitory). The readable media may be any available media that is accessible by the computer 701 and may include both volatile and non-volatile media, removable and non-removable media. The system memory 712 has computer readable media in the form of volatile memory, such as random access memory (RAM), and/or non-volatile memory, such as read only memory (ROM). The system memory 712 may store data such as the communication data 707 and/or program modules such as the operating system 705 and the communication software 706 that are accessible to and/or are operated on by the one or more processors 703.

The computer 701 may also have other removable/non-removable, volatile/non-volatile computer storage media. FIG. 7 shows the mass storage device 704 which may provide non-volatile storage of computer code, computer readable instructions, data structures, program modules, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 704, such as the operating system 705 and the communication software 706. Each of the operating system 705 and the communication software 706 (or some combination thereof) may have elements of the program modules and the communication software 706. The communication data 707 may also be stored on the mass storage device 704. The communication data 707 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 715.

A user may enter commands and information into the computer 701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 703 via a human machine interface 702 that is coupled to the bus 713, but may be connected by other interface and bus structures, such as a parallel port, game port, an IEEE 1394 Port (also known as a Firewire port), a serial port, network adapter 708, and/or a universal serial bus (USB).

The display device 711 may also be connected to the bus 713 via an interface, such as the display adapter 709. It is contemplated that the computer 701 may have more than one display adapter 709 and the computer 701 may have more than one display device 711. The display device 711 may be a monitor, an LCD (Liquid Crystal Display), light emitting diode (LED) display, television, smart lens, smart glass, and/or a projector. In addition to the display device 711, other output peripheral devices may be components such as speakers (not shown) and a printer (not shown) which may be connected to the computer 701 via the Input/Output Interface 710. Any step and/or result of the methods may be output (or caused to be output) in any form to an output device. Such output may be any form of visual representation, including, but not limited to, textual, graphical, animation, audio, tactile, and the like. The display device 711 and computer 701 may be part of one device, or separate devices.

The computer 701 may operate in a networked environment using logical connections to one or more remote computing devices 714a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 701 and a remote computing device 714a,b,c may be made via a network 715, such as a local area network (LAN) and/or a general wide area network (WAN). Such network connections may be through the network adapter 708. The network adapter 708 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components reside at various times in different storage components of the computing device 701, and are executed by the one or more processors 703 of the computer. An implementation of the communication software 706 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving, at a gateway from at least one access point, traffic data associated with one or more devices of a plurality of devices of a multi-device system; and
   based on a determination that a first portion of the traffic data is redundant with a second portion of the traffic data, causing the second portion of the traffic data to be discarded without being sent to at least one upstream device of the multi-device system, wherein the at least one access point, the gateway, and the plurality of devices are downstream of the at least one upstream device.

2. The method of claim 1, wherein at least one of the one or more devices of the plurality of devices comprises a Bluetooth Low Energy Device.

3. The method of claim 1, further comprising, based on the determination that the first portion of the traffic data is redundant with the second portion of the traffic data, sending a second instruction to cause the at least one access point associated with the first portion of the traffic data to continue sending the first portion of the traffic data to the at least one upstream device of the multi-device system.

4. The method of claim 1, wherein causing the second portion of the traffic data to be discarded comprises sending an instruction to the at least one access point associated with the second portion of the traffic data to stop the second portion of the traffic data from being sent to the at least one upstream device of the multi-device system.

5. The method of claim 4, further comprising sending the instruction to cause the at least one access point associated with the second portion of the traffic data to update an access control list to remove one or more devices of the plurality of devices associated with the second portion of the traffic data for a period of time.

6. The method of claim 4, further comprising sending the instruction to cause the at least one access point associated with the second portion of the traffic data to update an access control list to remove one or more devices of the plurality of devices associated with the second portion of the traffic data.

7. The method of claim 1, further comprising determining that the first portion of the traffic data is redundant with the second portion of the traffic data.

8. The method of claim 6, further comprising determining that the first portion of the traffic data is redundant with the second portion of the traffic data based on a comparison of device identifiers associated with the plurality of devices received with the first portion of the traffic data and the second portion of the traffic data.

9. The method of claim 8, wherein the device identifiers associated with the plurality of devices received with the first portion of the traffic data and the second portion of the traffic data comprise one or more of a media access control (MAC) address, an internet protocol (IP) address, or a universal unique identifier (UUID).

10. A non-transitory computer readable medium storing processor executable instructions that, when executed by at least one processor, cause the at least one processor to:
    receive, at a gateway from at least one access point, traffic data associated with one or more devices of a plurality of devices of a multi-device system; and
    based on a determination that a first portion of the traffic data is redundant with a second portion of the traffic data, cause the second portion of the traffic data to be discarded without being sent to at least one upstream device of the multi-device system, wherein the at least one access point, the gateway, and the plurality of devices are downstream of the at least one upstream device.

11. The non-transitory computer readable medium of claim 10, wherein at least one of the one or more devices of the plurality of devices comprises a Bluetooth Low Energy Device.

12. The non-transitory computer readable medium of claim 10, wherein the processor executable instructions further cause the at least one processor to, based on the determination that the first portion of the traffic data is redundant with the second portion of the traffic data, send a second instruction to cause the at least one access point associated with the first portion of the traffic data to continue sending the first portion of the traffic data to the at least one upstream device of the multi-device system.

13. The non-transitory computer readable medium of claim 10, wherein the processor executable instructions that cause the at least one processor to cause the second portion of the traffic data to be discarded comprises instructions that cause the at least one processor to send an instruction to the at least one access point associated with the second portion of the traffic data to stop the second portion of the traffic data from being sent to the at least one upstream device of the multi-device system.

14. The non-transitory computer readable medium of claim 13, wherein the processor executable instructions further cause the at least one processor to send the instruction to cause the at least one access point associated with the second portion of the traffic data to update an access control list to remove one or more devices of the plurality of devices associated with the second portion of the traffic data for a period of time.

15. The non-transitory computer readable medium of claim 13, wherein the processor executable instructions further cause the at least one processor to send the instruction to cause the at least one access point associated with the second portion of the traffic data to update an access control list to remove one or more devices of the plurality of devices associated with the second portion of the traffic data.

16. The non-transitory computer readable medium of claim 10, wherein the processor executable instructions further cause the at least one processor to determine that the first portion of the traffic data is redundant with the second portion of the traffic data.

17. The non-transitory computer readable medium of claim 15, wherein the processor executable instructions further cause the at least one processor to determine that the first portion of the traffic data is redundant with the second portion of the traffic data based on a comparison of device identifiers associated with the plurality of devices received with the first portion of the traffic data and the second portion of the traffic data.

18. The non-transitory computer readable medium of claim 17, wherein the device identifiers associated with the plurality of devices received with the first portion of the traffic data and the second portion of the traffic data comprise one or more of a media access control (MAC) address, an internet protocol (IP) address, or a universal unique identifier (UUID).

19. A system comprising:
an access point configured to send traffic data associated with one or more devices of a plurality of devices of a multi-device system; and
a gateway configured to:
receive the traffic data associated with the one or more devices of the plurality of devices; and
based on a determination that a first portion of the traffic data is redundant with a second portion of the traffic data, cause the second portion of the traffic data to be discarded without being sent to at least one upstream device of the multi-device system, wherein the access point, the gateway, and the plurality of devices are downstream of the at least one upstream device.

20. The system of claim 19, wherein at least one of the one or more devices of the plurality of devices comprises a Bluetooth Low Energy Device.

21. The system of claim 19, wherein the gateway is further configured to, based on the determination that the first portion of the traffic data is redundant with the second portion of the traffic data, send an instruction to cause the access point associated with the first portion of the traffic data to continue sending the first portion of the traffic data to the at least one upstream device of the multi-device system.

22. The system of claim 19, wherein the gateway is configured to cause the second portion of the traffic data to be discarded comprises sending an instruction to the access point associated with the second portion of the traffic data to stop the second portion of the traffic data from being sent to the at least one upstream device of the multi-device system.

23. The system of claim 22, wherein the gateway is further configured to send the instruction to cause the access point associated with the second portion of the traffic data to update an access control list to remove one or more devices of the plurality of devices associated with the second portion of the traffic data for a period of time.

24. The system of claim 22, wherein the gateway is further configured to send the instruction to cause the access point associated with the second portion of the traffic data to update an access control list to remove one or more devices of the plurality of devices associated with the second portion of the traffic data.

25. The system of claim 19, wherein the gateway is further configured determine that the first portion of the traffic data is redundant with the second portion of the traffic data.

26. The system of claim 25, wherein the gateway is further configured to determine that the first portion of the traffic data is redundant with the second portion of the traffic data based on a comparison of device identifiers associated with the plurality of devices received with the first portion of the traffic data and the second portion of the traffic data.

27. The system of claim 26, wherein the device identifiers associated with the plurality of devices received with the first portion of the traffic data and the second portion of the traffic data comprise one or more of a media access control (MAC) address, an internet protocol (IP) address, or a universal unique identifier (UUID).

* * * * *